United States Patent
Wu et al.

(10) Patent No.: US 11,411,331 B2
(45) Date of Patent: Aug. 9, 2022

(54) HYBRID TYPE WIRE-TO-WIRE CONNECTOR STRUCTURE AND POWER SUPPLY DEVICE HAVING THE SAME

(71) Applicant: Chicony Power Technology Co., Ltd., New Taipei (TW)

(72) Inventors: Cheng-Chan Wu, New Taipei (TW); Chao-Yi Huang, New Taipei (TW); Hung-Chieh Lin, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 669 days.

(21) Appl. No.: 16/441,845

(22) Filed: Jun. 14, 2019

(65) Prior Publication Data

US 2020/0350713 A1 Nov. 5, 2020

(30) Foreign Application Priority Data

May 2, 2019 (TW) .............................. 10811526.3

(51) Int. Cl.
*H01R 12/70* (2011.01)
*G06F 1/26* (2006.01)

(52) U.S. Cl.
CPC .......... *H01R 12/7005* (2013.01); *G06F 1/26* (2013.01)

(58) Field of Classification Search
CPC .. H01R 12/7005; H01R 13/74; H01R 13/741; H01R 13/745; G06F 1/26

(Continued)

(56) References Cited

U.S. PATENT DOCUMENTS 3,523,269 A * 8/1970 Bissland ............. H01R 13/743
439/358
3,573,716 A * 4/1971 Garver ................ H01R 13/743
439/353

(Continued)

FOREIGN PATENT DOCUMENTS

CN 101282016 A 10/2008
CN 101420090 A 4/2009

(Continued)

OTHER PUBLICATIONS

Office Action dated Jun. 10, 2020 of the corresponding Taiwan patent application No. 108115263.

(Continued)

*Primary Examiner* — Marcus E Harcum
(74) *Attorney, Agent, or Firm* — Chun-Ming Shih; HDLS IPR Services (57) ABSTRACT

A power supply device includes a power supply housing having an accommodating space and an accommodating opening, a hybrid wire-to-wire connector structure and a circuit board disposed in the accommodating space. The hybrid wire-to-wire connector structure includes a connecting seat and an adapter seat. The connecting seat has a signal line terminal and a power line terminal. The connecting seat is disposed in the accommodating opening through an annular rib. The adapter seat has a signal conduction end and a power conduction end. The adapter seat has formed a hook corresponding to the annular rib. The connecting seat and the adapter seat are combined through the signal conduction end inserted in the signal line terminal, the power conduction end inserted in the power line terminal and the hook clamped with the annular rib. Therefore, the power and signal connectors are integrated so as to simplify the assembly.

5 Claims, 7 Drawing Sheets

(58) Field of Classification Search
USPC ....... 439/546, 547, 549, 560, 562, 552, 557, 439/565
See application file for complete search history.

(56) References Cited

U.S. PATENT DOCUMENTS

| | | | | |
|---|---|---|---|---|
| 3,753,212 | A * | 8/1973 | Yamada | H01R 13/514 439/559 |
| 3,790,923 | A * | 2/1974 | Mathe | H01R 13/743 248/27.3 |
| 3,989,343 | A * | 11/1976 | Lucius | H01R 13/743 248/27.3 |
| 4,761,144 | A * | 8/1988 | Hunt, III | H01R 13/74 29/825 |
| 4,813,885 | A * | 3/1989 | Colleran | H01R 13/743 439/565 |
| 5,002,497 | A * | 3/1991 | Plocek | H01R 13/6315 439/247 |
| 5,279,507 | A * | 1/1994 | Kameyama | H01R 13/745 439/270 |
| 5,454,737 | A * | 10/1995 | Saba | H01R 31/00 439/655 |
| 5,525,074 | A * | 6/1996 | Tsuji | H01R 13/743 439/555 |
| 5,535,513 | A | 7/1996 | Frantz | |
| 5,595,509 | A * | 1/1997 | Fry | H01R 13/4362 439/752 |
| 5,651,697 | A * | 7/1997 | Cinquegrani | H01R 13/64 439/374 |
| 5,800,208 | A * | 9/1998 | Ishizuka | H01R 13/743 439/557 |
| 5,855,064 | A | 1/1999 | Chang | |
| 5,919,061 | A | 7/1999 | Wozniczka et al. | |
| 5,931,696 | A * | 8/1999 | Wozniczka | H01R 13/743 439/552 |
| 6,017,233 | A * | 1/2000 | Fry | H01R 13/6315 439/248 |
| 6,024,594 | A * | 2/2000 | Self, Jr. | H01R 13/6273 439/552 |
| 6,095,854 | A * | 8/2000 | Sommer | H01R 13/743 439/562 |
| 6,257,925 | B1 * | 7/2001 | Jones | H01R 13/6273 439/357 |
| 6,315,606 | B1 * | 11/2001 | Hwang | H01R 12/7005 439/378 |
| 6,450,834 | B1 * | 9/2002 | Polgar | H01R 13/74 439/546 |
| 6,547,591 | B2 * | 4/2003 | Okabe | H01R 13/743 439/557 |
| 7,094,109 | B2 * | 8/2006 | Chou | H01R 31/065 439/651 |
| 7,172,444 | B1 | 2/2007 | Huang et al. | |
| 7,182,637 | B2 * | 2/2007 | Coyle, Jr. | H01R 13/743 439/682 |
| 7,442,076 | B2 * | 10/2008 | Huang | H01R 13/641 439/502 |
| 7,448,915 | B2 * | 11/2008 | Chou | H01R 31/06 439/638 |
| 7,491,095 | B1 * | 2/2009 | Huang | H01R 12/716 439/682 |
| 7,553,188 | B2 * | 6/2009 | Whiteman, Jr. | H01R 13/743 439/565 |
| 7,651,350 | B1 * | 1/2010 | Wu | H01R 13/745 439/153 |
| 7,789,701 | B2 * | 9/2010 | Murr | H01R 13/743 439/552 |
| 7,901,242 | B2 * | 3/2011 | Chen | H01R 31/06 439/502 |
| 8,444,233 | B2 * | 5/2013 | Xu | G06F 1/181 439/565 |
| 8,736,106 | B2 * | 5/2014 | Byrne | H01R 31/02 174/59 |
| 8,932,071 | B2 * | 1/2015 | Venema | H01R 13/743 439/248 |
| 8,944,703 | B2 | 2/2015 | Song et al. | |
| 9,466,933 | B1 | 10/2016 | Wang | |
| 10,249,414 | B2 * | 4/2019 | Moran | H01R 43/02 |
| 10,355,412 | B2 * | 7/2019 | Matsuura | H01R 13/743 |
| 10,381,775 | B2 * | 8/2019 | Zheng | H01R 13/4368 |
| 10,553,995 | B2 * | 2/2020 | Houry | H01R 13/621 |
| 11,018,462 | B2 * | 5/2021 | Akagi | H01R 13/5202 |
| 2006/0094293 | A1 * | 5/2006 | Daggett | H01R 13/745 439/544 |
| 2007/0099451 | A1 * | 5/2007 | Chou | H05K 1/18 439/79 |
| 2007/0099496 | A1 * | 5/2007 | Shigeta | H01R 13/641 439/557 |
| 2007/0173112 | A1 * | 7/2007 | Murakami | H01R 13/743 439/557 |
| 2008/0122292 | A1 | 5/2008 | Minami | |
| 2012/0092835 | A1 | 4/2012 | Miller et al. | |
| 2013/0071070 | A1 | 3/2013 | Song et al. | |
| 2019/0027855 | A1 | 1/2019 | Dai et al. | |

FOREIGN PATENT DOCUMENTS

| | | |
|---|---|---|
| CN | 101807768 A | 8/2010 |
| CN | 204120538 U | 1/2015 |
| CN | 204129640 U | 1/2015 |
| EP | 1988610 A1 | 11/2008 |
| TW | 332938 B | 6/1998 |
| TW | M418474 U | 12/2011 |

OTHER PUBLICATIONS

Office Action dated Apr. 30, 2021 of the corresponding China patent application No. 201910407252.9.

* cited by examiner

HYBRID TYPE WIRE-TO-WIRE CONNECTOR STRUCTURE AND POWER SUPPLY DEVICE HAVING THE SAME

BACKGROUND OF THE INVENTION

Field of the Invention

The present invention generally relates to connector structures and, in particular to a wire-to-wire connector structure.

Description of Prior Art

Generally speaking, traditional power supply devices and other external electronic devices are connected through wires and electrical connectors to transmit power and signals. Besides, the way of connection therebetween is to provide a power connector and a signal connector on the circuit board of the power supply device, and cables will be used for connection and extension so as to facilitate connection with other external electronic devices.

Moreover, in the above connection way between the power supply device and other external electronic devices, the wires of the power connector and the signal connector are tied to the housing of the power supply device by wire harnesses for the purpose of cable routing. However, problems such as different wire lengths or long assembly time exist. Therefore, the connection way needs to be improved.

In view of the above drawbacks, the Inventor proposes the present invention based on his expert knowledge and elaborate researches in order to solve the problems of prior art.

SUMMARY OF THE INVENTION

Accordingly, an object of the present invention is to provide a hybrid type wire-to-wire connector structure, wherein the connecting seat has a signal line terminal and a power line terminal; the adapter seat has a signal conduction end and a power conduction end, and the conducting seat includes signal holes and power holes; thereby, the power and signal connectors are integrated so as to simplify the assembly.

Accordingly, an object of the present invention is to provide a hybrid type wire-to-wire connector structure to reduce labor time, process and material costs, and the yield rate and efficiency of production will be improved.

In order to achieve the object mentioned above, the present invention provides a hybrid type wire-to-wire connector structure for assembling in an accommodating opening of a housing including a connecting seat and an adapter seat. The connecting seat has a signal line terminal and a power line terminal. One end of the connecting seat is extended with an annular rib corresponding to the accommodating opening, and the connecting seat is disposed in the accommodating opening through the annular rib. The adapter seat has a signal conduction end with respect to the signal line terminal and a power conduction end with respect to the power line terminal. The adapter seat is extended with a hook corresponding to the annular rib, wherein the connecting seat and the adapter seat are combined through the signal conduction end inserted in the signal line terminal, the power conduction end inserted in the power line terminal, and the hook clamped with the annular rib.

In order to achieve the object mentioned above, the present invention provides a power supply device comprising a power supply housing, a circuit board, and a hybrid type wire-to-wire connector structure. The power supply housing has an accommodating space and an accommodating opening. The circuit board is disposed in the accommodating space. The hybrid type wire-to-wire connector structure comprises a connecting seat, a conducting seat, a plurality of signal wires, a plurality of power wires, and an adapter seat. The connecting seat has a plurality of signal terminal slots and a plurality of power terminal slots. One end of the connecting seat is extended with an annular rib corresponding to the accommodating opening, and the connecting seat is disposed in the accommodating opening through the annular rib. The conducting seat is inserted on the circuit board, and the conducting seat includes a plurality of signal holes and a plurality of power holes. One end of each signal wire is inserted in the signal hole and the other end is connected to the signal terminal slot. One end of each power wire is inserted in the power hole and the other end is connected to the power terminal slot. The adapter seat has a plurality of signal conduction columns with respect to the signal terminal slots and a plurality of power conduction columns with respect to the power terminal slots. The adapter seat is extended with a hook corresponding to the annular rib, wherein the connecting seat and the adapter seat are combined through the signal conduction columns inserted in the signal terminal slots, the power conduction columns inserted in the power terminal slots, and the hook clamped with the annular rib.

Comparing to the prior art, the hybrid type wire-to-wire connector structure of the present invention has provided the connecting seat having a signal line terminal and a power line terminal, the adapter seat having a signal conduction end and a power conduction end, and the conducting seat having signal holes and power holes so as to integrate the connections of power and signal, and that has advantages of simplifying the assembly and reducing labor time, process schedule and material costs, thus the yield of production and efficiency will be improved. Moreover, the connecting seat of the present invention is provided as an extension joint, and it can be mounted on the circuit board or fixed on the housing of power supply. In addition, the connecting seat of the present invention has an annular rib extended from a periphery thereof, and the adapter seat has extended with a hook with respect to the annular rib to be positioned on the connecting seat. Thereby, the utility of the invention can be enhanced.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
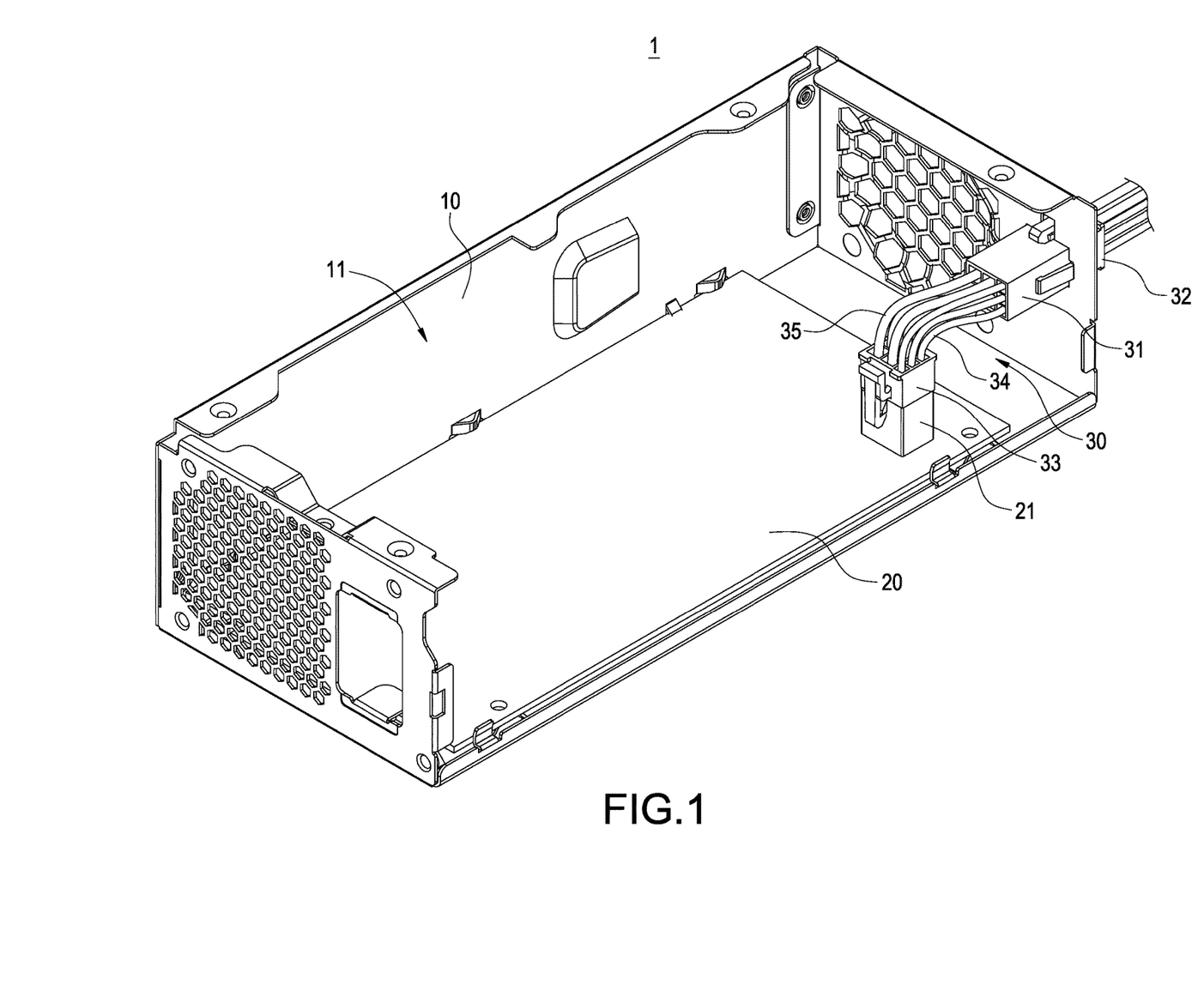
FIG. 1 and FIG. 2 depict perspective views of two sides of power supply device of the present invention.
Figure 2:
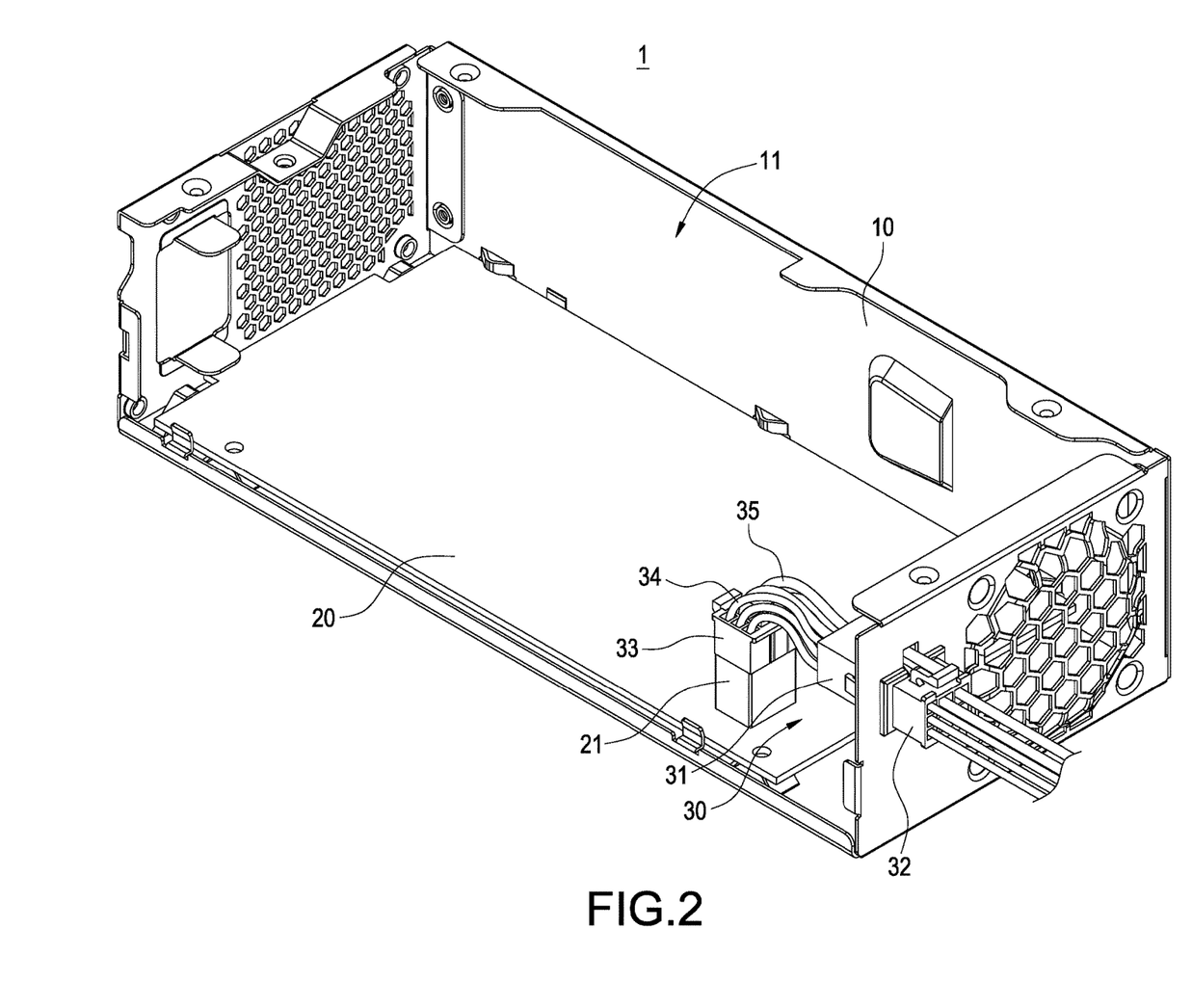

Please refer to FIG. 1 and FIG. 2, which depict perspective views of two sides of power supply device of the present invention. The power supply device 1 of the present invention includes a power supply housing 10, a circuit board 20, and a hybrid type wire-to-wire connector structure 30. The circuit board 20 is displaced in the power supply housing 10. The hybrid type wire-to-wire connector structure 30 is assembled with the power supply housing 10 and electrically connected with the circuit board 20 for connecting an external electronic device. Moreover, other electronic components in the power supply housing 10 are customary and will not be described later. More detail descriptions of the power supply device 1 and the hybrid type wire-to-wire connector structure 30 are as follows.

Figure 3:
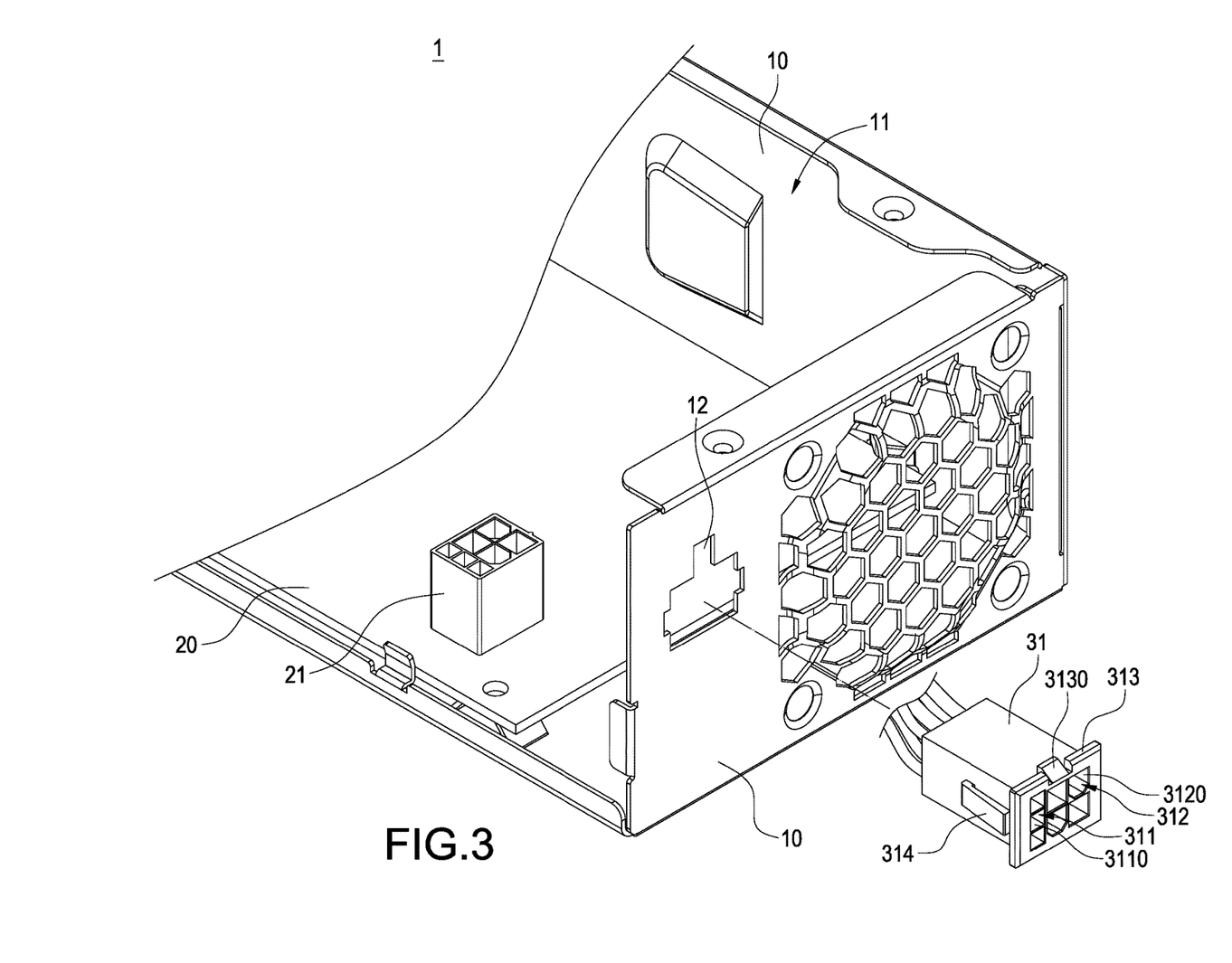
FIG. 3 depict a combination schematic view of the adapter seat and housing of the present invention.
Figure 4:
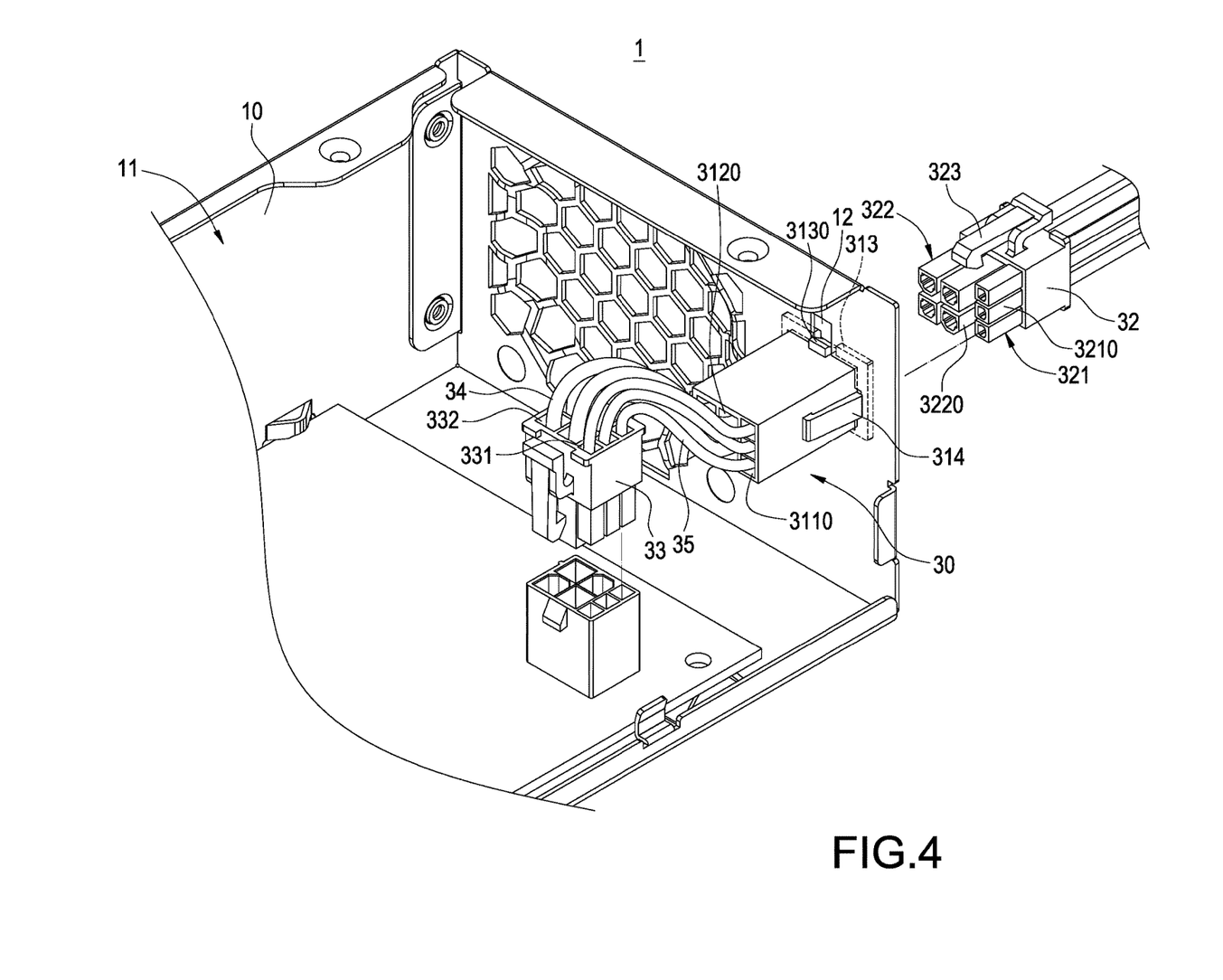
FIG. 4 depict a combination schematic view of the hybrid type wire-to-wire connector structure and the circuit board of the present invention.
Figure 5:
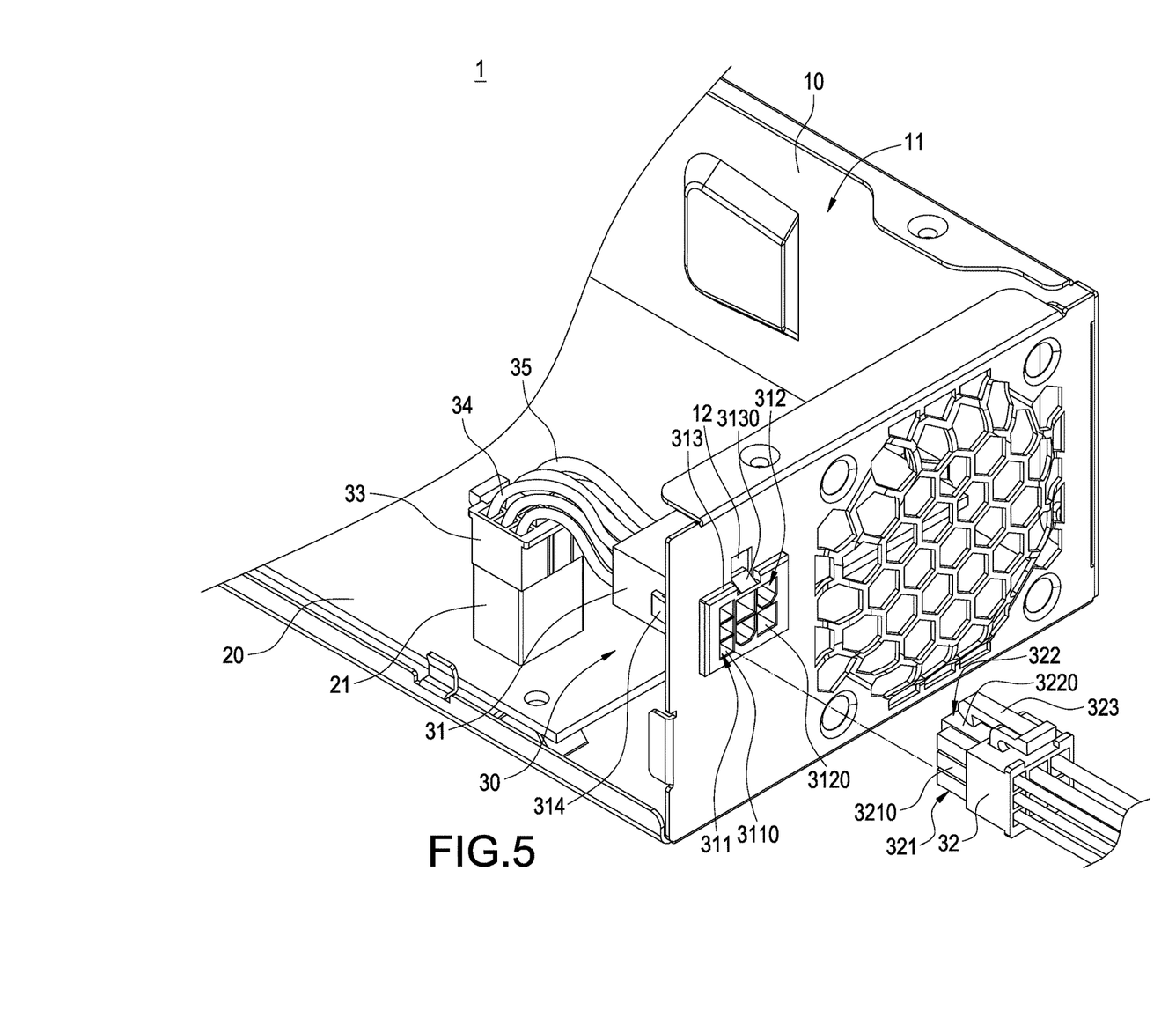
FIG. 5 depict a combination schematic view of the adapter seat and the connecting seat of the hybrid type wire-to-wire connector structure.

Please further refer to FIG. 3 to FIG. 5, they depict a combination schematic view of the adapter seat and the housing of the present invention, a combination schematic view of the hybrid type wire-to-wire connector structure and the circuit board of the present invention, and a combination schematic view of the adapter seat and the connecting seat of the hybrid type wire-to-wire connector structure of the present invention. As shown in FIG. 3, the power supply housing 10 has an accommodating space 11 and an accommodating opening 12. The circuit board 20 is disposed in the accommodating space 11, and the circuit board 20 is provided with an electrical connector 21. In addition, the hybrid wire-to-wire connector structure 30 is assembled in the accommodating opening 12 of the power supply housing 10 for connecting with the electrical connector 21 and connected to an external electronic device.

Figure 6:
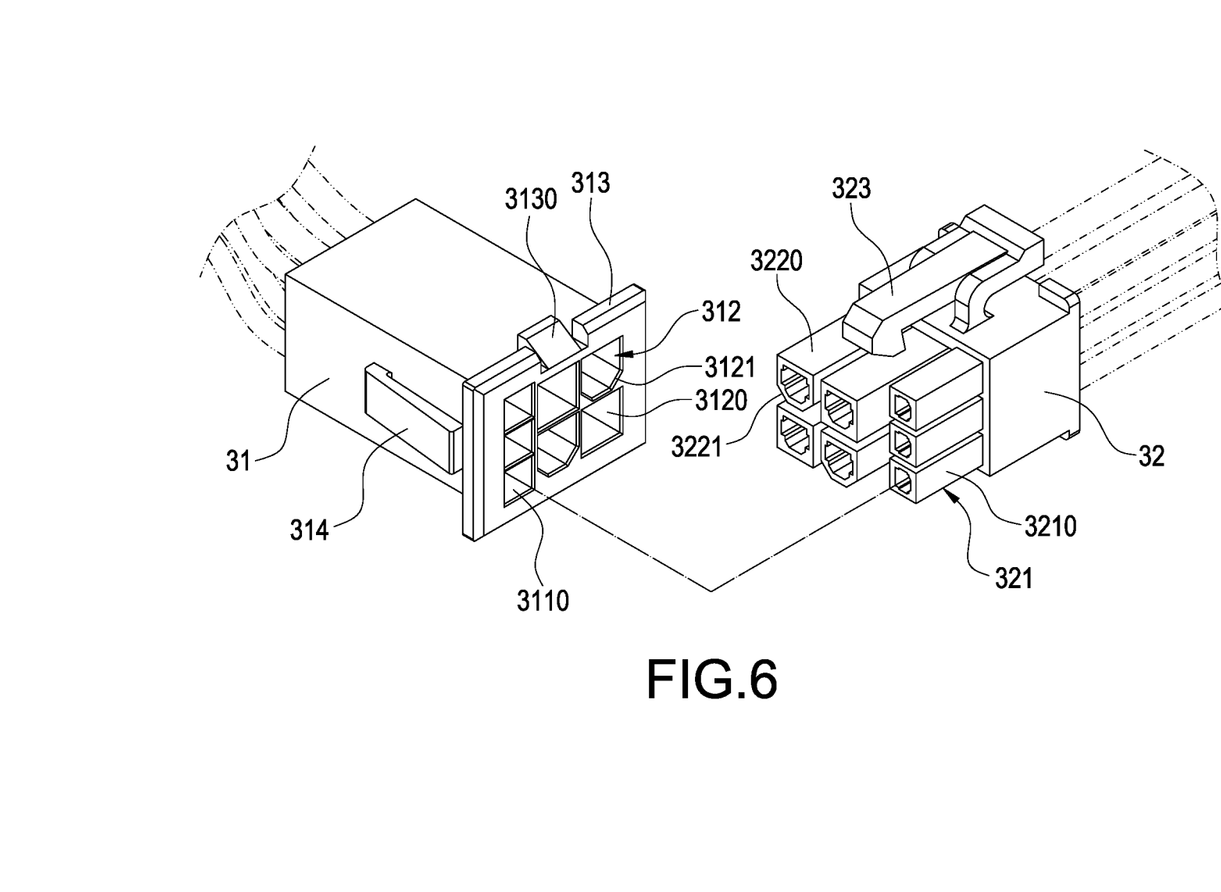
FIG. 6 depict a combination schematic view of the connecting seat and the adapter seat of the present invention.
Figure 7:
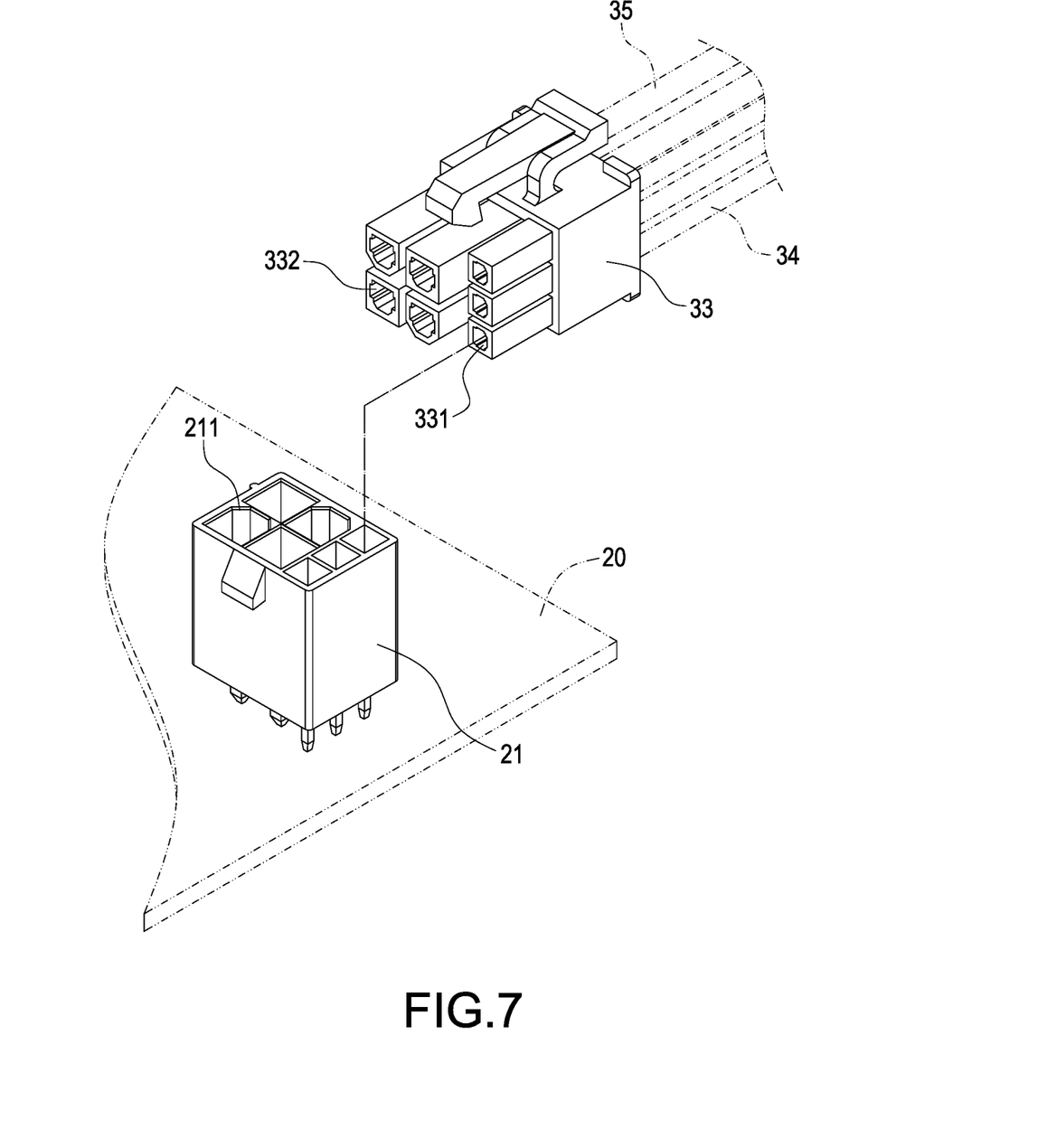
FIG. 7 depict a combination schematic view of the conducting seat and the electrical connector of the present invention.

Please also refer to FIG. 6 and FIG. 7, they depict a combination schematic view of the connecting seat and the adapter seat of the present invention, and a combination schematic view of the conducting seat and the electrical connector of the present invention. The hybrid type wire-to-wire connector structure 30 comprises a connecting seat 31 and an adapter seat 32. The connecting seat 31 has a signal line terminal 311 and a power line terminal 312. Specifically, the signal line terminal 311 includes a plurality of signal terminal slots 3110; besides, the power line terminal 312 includes a plurality of power terminal slots 3120.

Moreover, one end of the connecting seat 31 is extended with an annular rib 313 corresponding to the accommodating opening 12, and the connecting seat 31 is disposed in the accommodating opening 12 through the annular rib 313. It is worthy to note that the opening profile of the accommodating opening 12 is provided corresponding to the contour of the connecting seat 31. In addition, the connecting seat 31 is formed with a pair of elastic arms 314 on opposite two outer sides. Thereby, when the connecting seat 31 is inserted into the accommodating opening 12 from an outer side of the power supply housing 10, the annular rib 313 will abut against the periphery of the accommodating opening 12. Besides, the pair of elastic arms 314 are elastically compressed slightly when passing the accommodating opening 12 and will return to the original position after passing through the accommodating opening 12. Thereby, when the adapter seat 32 is inserted with respect to the connecting seat 31, the connecting seat 31 will not be loosen or detached under an external force.

On the other hand, the adapter seat 32 has a signal conduction end 321 with respect to the signal line terminal 311 and a power conduction end 322 with respect to the power line terminal 312. Specifically, the signal conduction end 321 includes a plurality of signal conduction columns 3210, and the power conduction end 322 includes a plurality of power conduction columns 3220.

It is worthy to note that, the signal terminal slots 3110 and the power terminal slots 3120 are square slots. Besides, the depths of the signal terminal slots 3110 are greater than the depths of the power terminal slots 3120; therefore, the lengths of the signal conduction columns 3210 are greater than the lengths of the power conduction columns 3220. Thereby, the misinsertion can be prevented, and to have a foolproof effect, and the purpose of saving material can be achieved.

It is worthy to note that, at least one part of the power conduction columns 3220 are formed with foolproof structures such as chamfers; besides, the power terminal slots 3120 are also provided foolproof holes 3121 with chamfers. Therefore, the adapter seat 32 can be inserted into the connecting seat 31 positively without misinsertion.

Furthermore, the adapter seat 32 are extended with a hook 323 corresponding to the annular rib 313. The connecting seat 31 and the adapter seat 32 are combined through the signal conduction columns 321 inserted in the signal terminal slots 311, the power conduction columns 322 inserted in the power terminal slots 312, and the hook 323 clamped with the annular rib 313. Preferably, one end of the annular rib 313 has a notch 3130 corresponding to the hook 323, and the hook 323 passes through the notch 3130 to be clamped in the accommodating opening 12.

In one embodiment of the present invention, the hybrid type wire-to-wire connector structure 30 further includes a conducting seat 33, a plurality of signal wires 34 and a plurality of power wires 35. In more detail, the conducting seat 33 includes a plurality of signal holes 331 and a plurality of power holes 332. In addition, each of the signal wires 34 has one end inserted in the signal hole 331 and the other end connected to the signal terminal slot 3110; and further, each of the power wires 35 has one end inserted in the power hole 332 and the other end connected to the power terminal slot 3120. Thereby, the conducting seat 33 is connected to the connecting seat 31 through the signal wires 34 and the power wires 35, and it can be further connected to the electrical connector 21 of the circuit board 20.

Furthermore, the signal terminal slots 311 and the power terminal slots 312 of the connecting seat 31, the signal conduction columns 321 and the power conduction columns 322 of the adapter seat 32, and the signal holes 331 and the power holes 332 of the conducting seat 33 are provided with terminals separately. However, the structures of the terminals are conventional, and the structures are not shown in the embodiment. Moreover, in the present invention, each of the power terminal slots 312, the power conduction columns 322 and the power holes 332 can accommodate at least two power wires with a wire diameter of 16 AWG to increase the convenience of use.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A power supply device, comprising:
   a power supply housing having an accommodating space and an accommodating opening;
   a circuit board disposed in the accommodating space;
   a hybrid type wire-to-wire connector structure, comprising
      a connecting seat having a plurality of signal terminal slots and a plurality of power terminal slots; one end of the connecting seat extending to form an annular rib corresponding to the accommodating opening, and the connecting seat disposed in the accommodating opening through the annular rib; and
      a conducting seat inserted on the circuit board, and the conducting seat including a plurality of signal holes and a plurality of power holes;
   a plurality of signal wires, one end of each signal wire inserted in the signal hole and another end connected to the signal terminal slot;
   a plurality of power wires, one end of each power wire inserted in the power hole and another end connected to the power terminal slot; and
   an adapter seat having a plurality of signal conduction columns with respect to the signal terminal slots and a plurality of power conduction columns with respect to the power terminal slots, and the adapter seat extended with a hook corresponding to the annular rib, wherein the connecting seat and the adapter seat are combined through the signal conduction columns inserted in the signal terminal slots, the power conduction columns inserted in the power terminal slots, and the hook clamped with the annular rib.

2. The power supply device according to claim 1, wherein depths of the signal terminal slots are greater than depths of the power terminal slots.

3. The power supply device according to claim 2, wherein lengths of the signal conduction columns are greater than lengths of the power conduction columns.

4. The power supply device according to claim 1, wherein one end of the annular rib has a notch corresponding to the hook, and the hook passes through the notch to be clamped in the accommodating opening.

5. The power supply device according to claim 1, wherein the connecting seat has formed a pair of elastic arms on two opposite outer sides.

* * * * *